Haines Champlin Hibbard  Inventor
By James A. Reilly  Attorney

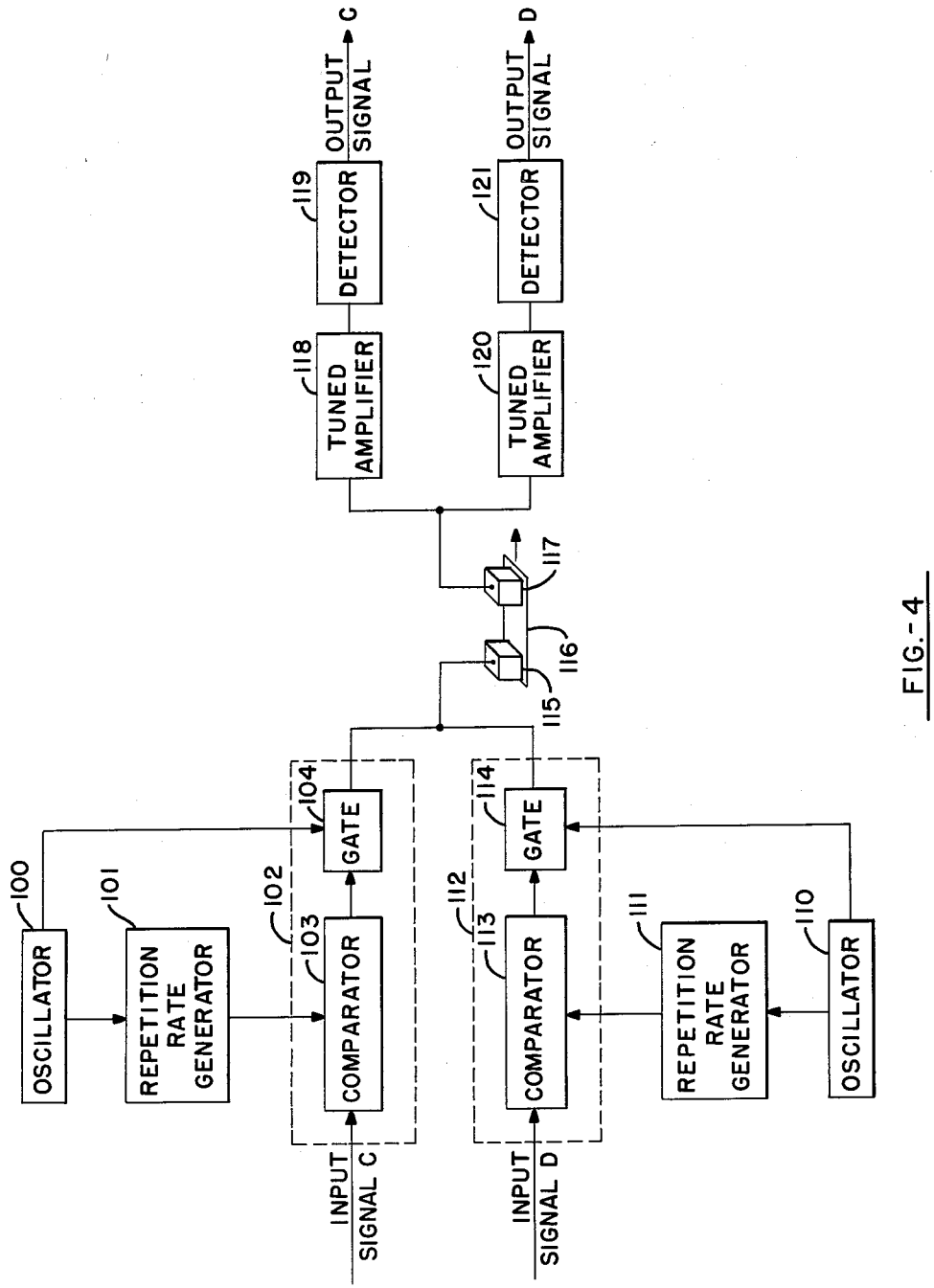

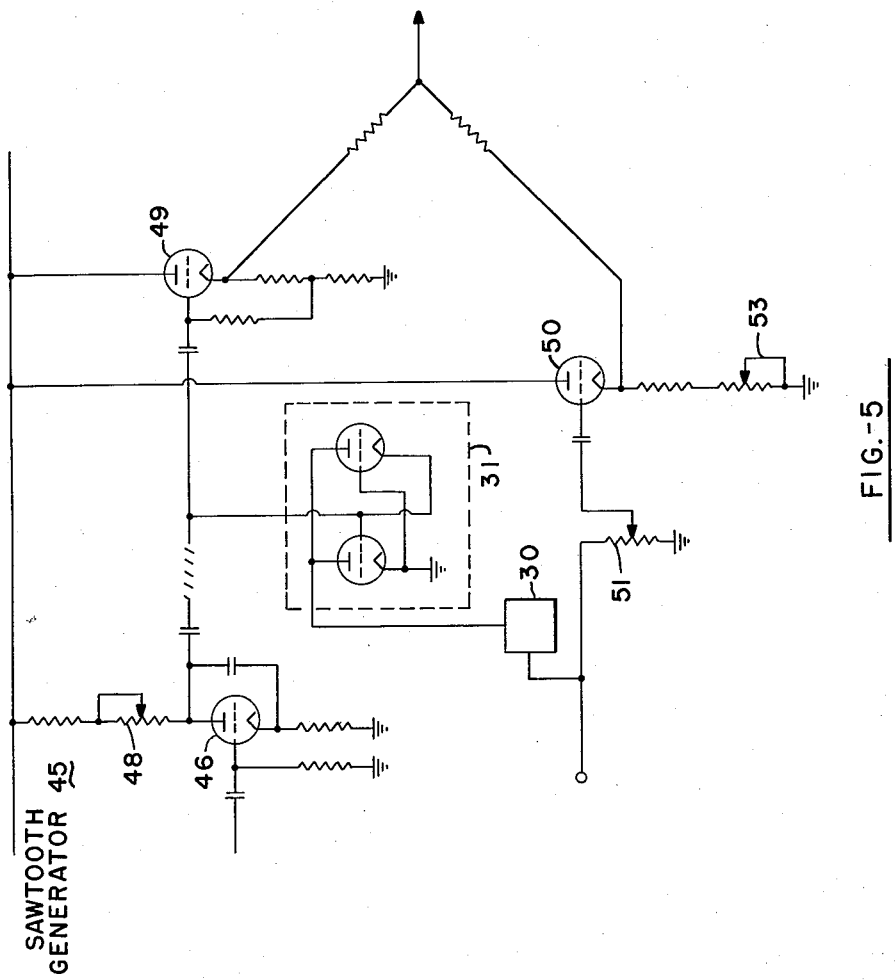

United States Patent Office 2,982,923
Patented May 2, 1961

2,982,923
SYSTEM OF SEISMIC RECORDING

Haines C. Hibbard, Tulsa, Okla., assignor, by mesne assignments, to Jersey Production Research Company Filed Jan. 6, 1958, Ser. No. 707,190

6 Claims. (Cl. 332—9)

This invention pertains generally to systems for recording and reproducing seismic signals. More particularly, the invention pertains to improved seismic recording systems in which a seismic signal is used to modulate the duration of pulses of a high-frequency carrier signal.

It is well known in the art of recording seismic signals to modulate a relatively high-frequency carrier signal with a seismic signal. For example, it is a well-known practice to frequency modulate a relatively high-frequency carrier wave with a seismic signal; and it is equally well known to vary the duration of energy content of the individual pulses in a relatively high-frequency pulsing signal with a seismic signal.

The term "seismic signal" as used in the description of this invention is intended to mean the train of electrical signals which is produced by a geophone or other seismic detector in response to the reception of elastic seismic waves. The expression is also intended to include a train of electrical signals obtained by reproducing a reproducible-trace recording of a seismic signal. Thus, it is a popular technique in seismic methods of geophysical prospecting to record the seismic signal generated by a seismic detector in the form of a "phonographically reproducible" trace and to thereafter reproduce the information recorded on the trace. "Phonographically reproducible" traces include magnetic traces, variable-density photographic traces, and variable-area photographic traces—as described, for example, in U.S. Patent No. 2,051,153 (F. T. Rieber).

The use of pulse-duration or -width modulation is of particular interest and value in recording seismic signals, since it has been established that this technique greatly reduces recording noise—especially internal noise and noise occasioned by variatiins in the relative speeds of a recording device and its recording medium.

While pulse-width modulation has proven to be of value in recording seismic signals, it has been found that these systems are not entirely free of deficiencies. Thus, it has been found that conventional systems of pulse-width modulation are limited in their modulation range. This is particularly true in the case where a seismic signal is recorded as a trace on magnetic tape or other magnetic recording media. Reasonably faithful recording is obtained so long as the amplitude of the seismic signal has some intermediate value. When the amplitude of the signal, however, is either very small or very large, the resulting degree of modulation is such as to introduce serious distortions in the recorded signal. Consider, for example, a pulse-width modulation system which has a fixed repetition rate and a movable center pulse that divides the time between the repetition-rate pulses. It has been found in such a system that, as the center pulse approaches one of the repetition-rate pulses on either side of it in response to a modulating signal, a recording medium such as magnetic tape is unable to distinguish clearly between the center pulse and the repetition-rate pulse. Expressed otherwise, it has been found that the movable center pulse must be restricted in its movement between the two adjacent repetition-rate pulses; otherwise, the information carried by the center-line pulse is confused with the information carried by the repetition-rate pulses. More particularly, it has been found that the movable center-line pulse—for good fidelity—must remain within an area of movement between two adjacent repetition-rate pulses constituting generally less than 75 percent of the total distance between the repetition-rate pulses. In other words, it may be stated that such a system has an effective modulation range at best of about 75 percent.

In view of the above limitations of conventional pulse-width or pulse-duration modulation systems, it is an object of this invention to provide an improved pulse-modulation technique for use in recording and reproducing seismic information. More particularly, it is an object of the invention to provide a pulse-width or pulse-duration modulation system in which greater ranges of modulation are obtainable than the possible with presently conventional systems of this type. The system of the invention is further characterized by its adaptability for "multiplexing"—i.e., the practice of recording more than one seismic signal upon a single recording channel. The invention is further especially characterized by its adaptibilty to seismic recording apparatus and systems which use magnetic recording media.

The above and related objects of the invention, which will be expressly discussed or readily apparent from the following description, as realized in accordance with this invention by the use of improved pulse-width or pulse-duration modulation techniques. More particularly, the invention makes use of a constant-frequency carrier signal, which is passed through an electronic gate periodically to produce pulses of the carrier signal. In the absence of a modulating signal—i.e., a seismic signal—the bursts or pulses of carrier signal are equal in length to one another and are separated by equal periods of time in which no signal is transmitted. When a modulating seismic signal is imposed upon the carrier signal, the duration of the pulses of carrier signal is varied relative to the "off" periods between the pulses—depending upon the amplitude and algebraic sign of the modulating signal. In this connection, it is noteworthy that this invention is additionally characterized by its linear response over a wide range of modulation and by its sharp time definitions.

An additional important characteristic of the invention lies in the fact that the bursts or pulses of a modulated carrier signal are continuously synchronized with the repetition-rate source—i.e., the trigger signal which gives rise to the periodic bursts or pulses of carrier signal. This feature of the invention is very instrumental in insuring a high degree of fidelity over a substantially 100% range of modulation. It will be recognized, of course, that as in conventional modulation systems it is necessary that the frequency of the pulses in the present invention exceed the frequency of the modulating signal to an extent sufficient to provide adequate definition of the modulating signal. It is further necessary in the present invention that the constant-frequency carrier signal present within each pulse have a frequency greater than that of the pulsing frequency. More particularly, the frequency of the carrier signal should be enough greater than that of the sampling pulses so that good time definition of the length of the carrier burst may be readily established. In general, it has ben found that the carrier signal should have a frequency at least about five times the pulsing frequency and preferably about ten times that of the pulsing frequency.

Viewed from a slightly different approach, the present invention pertains to a modulation system in which a high-frequency, constant-amplitude carrier signal is neither amplitude-modulated nor frequency-modulated by the modulating signal. Instead, the carrier signal is divided along its time axis into a plurality of equal segments or periods—the number of segments or periods per unit time being sufficient to provide adequate definition of the modulating signal. Each segment or period is provided with a reference time point, successive reference time points being equally spaced in the same manner as the segments or periods themselves. Conveniently, the reference time point in each period or segment is the leading edge of the period or segment. Then, depending upon the amplitude and algebraic sign of the modulating signal at that point, a burst of the carrier signal is emitted starting at that point. If the amplitude of the modulating signal is zero, the carrier signal is preferably emitted for half of each time period or segment. If the value of the modulating signal is at its maximum negative value, virtually no burst of the carrier signal is emitted; and, if the modulating signal is at a maximum positive value, the burst of carrier signal extends substantially throughout the entire period.

To aid in understanding the invention further, attention is next directed to the drawing in which:

Figure 4 is a schematic block diagram of a multiplex recording system adapted to record two separate signals on a single recording channel.

Figure 5 shows a modification of the invention.

Figure 1:
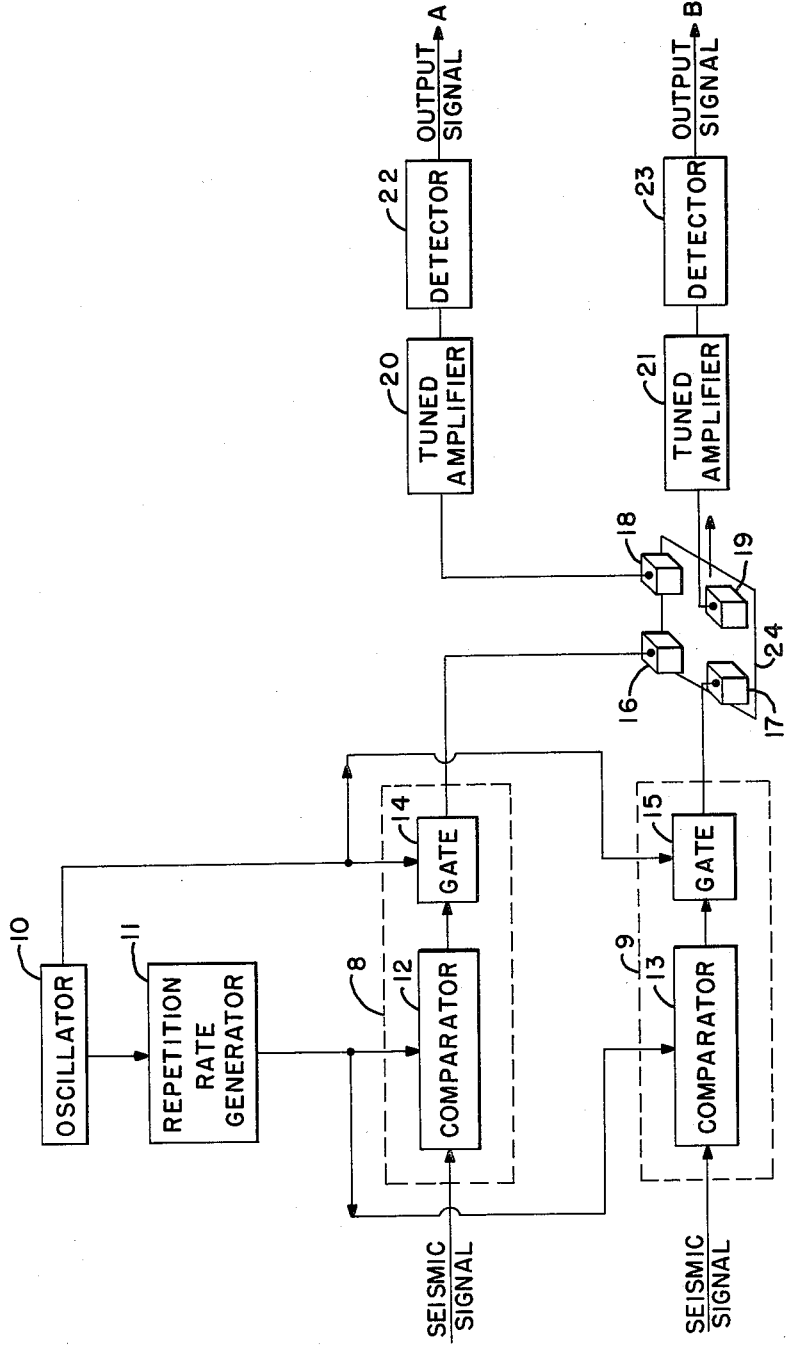
Figure 1 is a schematic block diagram of a two-channel recording and reproducing system illustrating the best mode contemplated for practicing the invention.

Referring first to Figure 1, there are illustrated an oscillator 10, repetition-rate divider and generator 11, modulation stages 8 and 9 shown in dotted outline, electronic switches or gates 14 and 15, and recording heads 16 and 17. Also illustrated are a magnetic tape recording medium 24, reproducing heads 18 and 19, tuned amplifiers 20 and 21, and detectors 22 and 23. Each of the modulation stages 8 and 9 includes a comparator and an electronic gate.

In discussing the system of Figure 1, it will be assumed that the signals introduced to modulation stages 12 and 13 are two separate seismic signals. Thus, it will be assumed that these signals are the signals received from geophones or other seismic detectors and that they possess frequency components ranging from about 10 to 100 cycles per second. As is conventional in the art, it will be appreciated that filters, attenuators, amplifiers, and the like may be interposed between the actual seismic signal sources and the modulation stages.

It will further be assumed in discussing the system of Figure 1 that the oscillator 10 produces a carrier signal having a very high frequency relative to the seismic signal—for example, say 10 kilocycles. It will further be assumed that the repetition-rate divider is of a character to generate a signal having a frequency of about one-tenth that of the carrier—i.e., about 1000 cycles per second.

Referring, then, specifically to the oscillator 10, it is preferred that this member be of a character to generate a constant-frequency and constant-amplitude sine-wave signal which is transmitted separately and simultaneously to the repetition-rate generator 11 and the gates 14 and 15. The repetition-rate generator, in turn, transmits a pulsing signal simultaneously and separately to the amplitude comparators 12 and 13 in the modulating stages.

As noted earlier, this invention makes use of a high-frequency signal which is triggered or released in bursts, the bursts being constant in frequency but variable in duration. In this connection, it is the function of the oscillator 10 in Figure 1 to generate the high-frequency carrier signal; and it is the function of the repetition-rate generator 11 to control the frequency of the bursts of the carrier signal. Although the oscillator 10 and the generator 11 generate signals having different frequencies, it is an essential feature of the invention that the two signals be continuously maintained in a preselected phase relationship. In other words, the two signals should be phase-locked. By observing this condition, it will be apparent that the gates or switches 14 and 15 may be made to operate repeatedly at a given point along the wave form of the carrier signal emitted by the oscillator 10.

As noted above, it is a function of the generator 11 of Figure 1 to provide a repetitive signal which is used as a time reference for each pulse released by the gates 14 and 15. The signal is also used by the comparators 12 and 13 to translate amplitude characteristics of the modulating signals fed to the comparators into time-duration values. Expressed otherwise, the signals from the generator 11 are used to fix one edge (i.e., either the leading or trailing edge) of pulses emitted by the gates 14 and 15; and instantaneous amplitude values of the modulating signals (i.e., the seismic signals) introduced to the comparators 12 and 13 position the opposite or remaining edge of each such pulse. As a result, the gates 14 and 15 regularly emit pulses of the carrier signal from oscillator 10—the duration of the pulses being a function of the amplitude values of the seismic signals introduced to the comparators 12 and 13.

The signals from gates 14 and 15 of the modulators 8 and 9, respectively, are conveyed to recording heads 16 and 17. These heads impress a magnetic record in the form of separate magnetic traces on the magnetic recording medium 24. It will be apparent to those skilled in the art that the magnetic recording heads 16 and 17 may be any conventional type. In general, such heads are tiny electromagnets whose air gaps are positioned in transverse relation to the direction of relative movement between the heads and the magnetic recording medium. Magnetic flux through the air gaps is varied in response to the signals impressed upon the heads; and the varying flux causes corresponding variations in the magnetization of the recording medium.

In addition to the recording heads 16 and 17, Figure 1 also includes two reproducing heads 18 and 19. These latter heads are aligned with the recording heads such that magnetic traces formed on the recording medium travel past the reproducing heads as the medium is moved. The reproducing heads pick up the recorded signals and transmit them to the amplifiers 20 and 21. As noted in the figure, the amplifiers are tuned to amplify selectively signals having a frequency corresponding to that of oscillator 10. Thus, the signals transmitted by the amplifiers 20 and 21 to the detectors 22 and 23 are the bursts of the carrier signal that have been recorded on the medium 24. The detection stages 22 and 23 in effect integrate the signal bursts and recreate the modulating seismic signals fed to the comparators 12 and 13.

Figure 2:
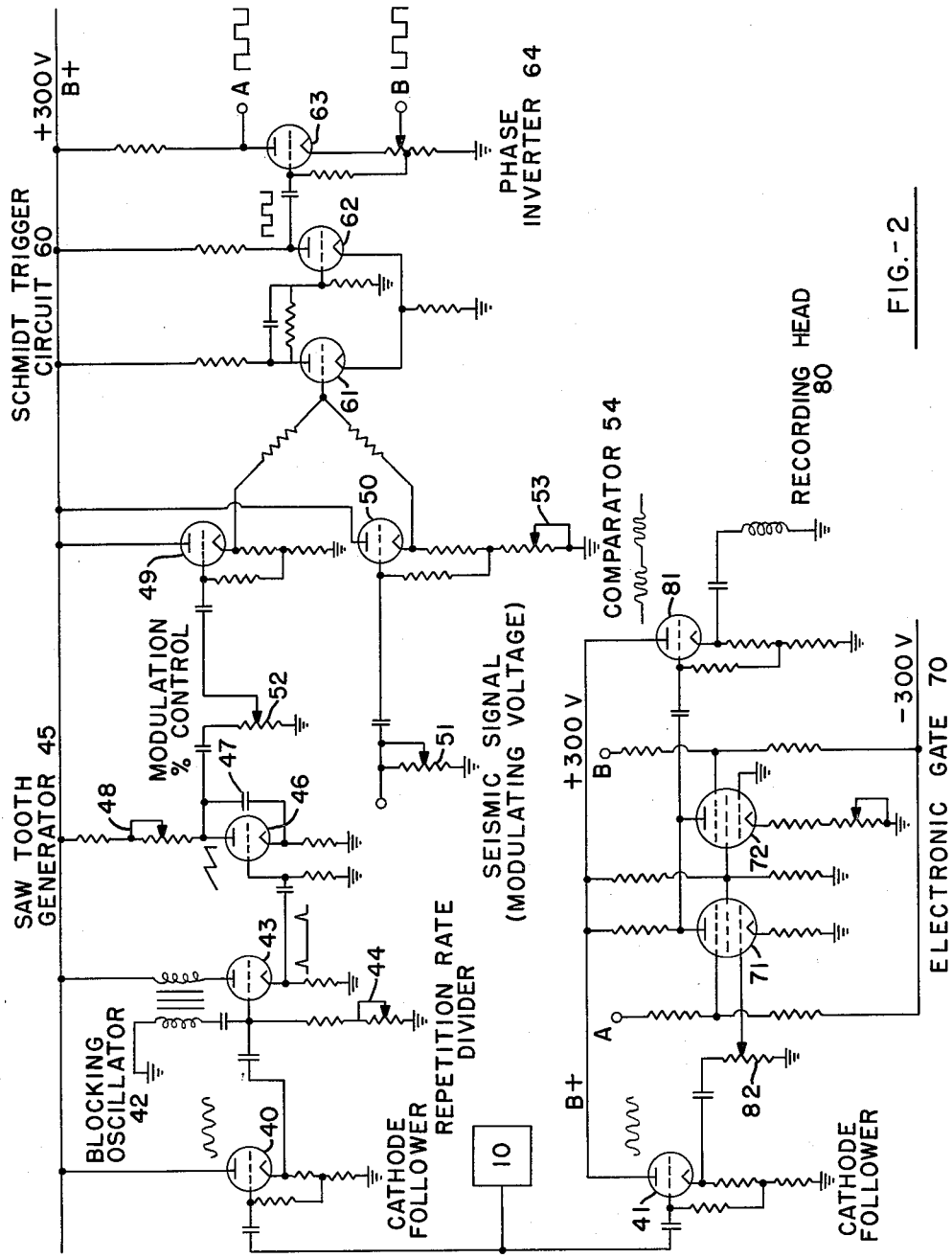
Figure 2 is a more detailed schematic diagram of a recording circuit suitable for carrying out the invention.
Figure 3:
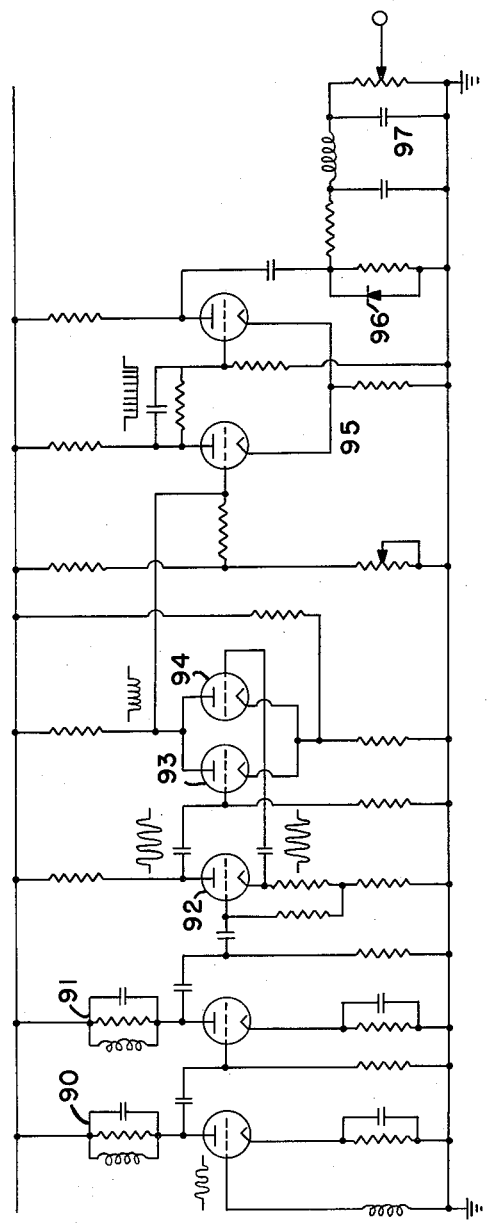
Figure 3 is a more detailed schematic diagram of a circuit for reproducing a signal recorded by the circuit of Figure 2.

Having thus generally outlined the nature and functioning of this invention, attention is next directed to Figures 2 and 3 in which is shown circuitry suitable for carrying out the invention. It will be recognized that a number of electronic and electrical components may be used to implement the system shown in Figure 1. However, it is contemplated that the particular system shown in Figures 2 and 3 offers unique advantages with respect to other known systems. It will be noted in both of these figures that wave forms of the signals in various parts of the system have been included to better illustrate the invention.

Referring first to Figure 2, it will be noted that the oscillator for the carrier frequency has again been simply designated by the square 10. While the particular type of oscillator employed is not an especially critical aspect of this invention, it is preferred that the oscillator provide a sine-wave signal. It is further preferred that it be a stable oscillator, RC oscillators of the Wien bridge or stabilized tuning-fork types being preferred.

The high-frequency signal from the oscillator 10 is transmitted to two cathode followers 40 and 41. The output of follower 40 is further transmitted to blocking oscillator circuit 42 which includes a triode 43. The blocking oscillator circuit in this instance serves as a frequency divider, and variable resistor 44 regulates the degree of frequency division as desired.

The use of cathode followers, it will be recognized, is not a critical aspect of the invention; but their presence is desirable in most instances in order to isolate the oscillator 10 from any feedback or other reaction from following components in the circuitry. They are also valuable in multichannel installations (e.g., in multichannel magnetic tape seismic recorders) for isolating the various channels from one another.

The resulting series of sharp-peaked signals emitted by the cathode of triode 43 are used to synchronize the saw-toothed generator circuit 45, one saw-tooth being produced for each pulse. Conveniently, a thyratron 46 is used in the saw-toothed generator circuit; and the peaks from the blocking oscillator are introduced upon the grid of this tube. Condenser 47 in the saw-toothed generator circuit in combination with resistor 48 is preferably preselected so that complete build-up of the charge on the condenser does not occur before the synchronizing pulse from the blocking oscillator 42 arrives. The latter signal causes the thyratron 46 to remove the charge from the condenser, thereby defining the sharp edge of the saw-toothed signal produced.

The saw-toothed signal is applied to the grid of cathode follower 49 which together with another cathode follower 50 comprises a comparator or adder circuit 54. The modulating signal—i.e., a seismic signal—is applied through a variable resistor 51 to the grid of the other cathode follower 50. Variable resistor 53 is provided in the cathode circuit of the follower 50 and is adjusted so as to make the cathode voltages of the two cathode followers equal to one another in the absence of an applied voltage. Also, the static voltage of the comparator circuit is placed substantially at the center of the unstable region of the following Schmidt trigger circuit 60.

Variable resistors 51 and 52 are provided in the grid circuits of the two cathode followers 50 and 49, respectively, to serve in effect as a percentage modulation control. Also, these resistors are adjusted so that the amplitude of the saw-toothed signal is always at least slightly greater than the largest seismic signal expected.

Before explaining further the function of the comparator circuit 54, it is considered desirable to describe the action of the Schmidt trigger circuit 60 which follows. This circuit conveniently consists of two triodes 61 and 62 regeneratively coupled. Depending upon whether the input voltage to the grid of triode 61 is above or below the unstable region of the trigger circuit, the trigger circuit will remain in one of two stable states. Referring now back to the comparator circuit 54 for the moment, it will be recognized that the saw-toothed signal from the cathode follower 49—in the absence of a modulating signal from follower 50—will cause the Schmidt trigger circuit 60 to generate a square-wave signal having two periods of equal duration in each cycle. In other words, the signal produced by the trigger circuit 60 under these circumstances is a zero-modulated signal. Any slight variations in the duration of the two portions of each cycle of the square wave from the trigger circuit may be made equal by adjustment of the variable resistor 53.

It will now be apparent that the introduction of a seismic signal upon the cathode follower 50—when added in the comparator 54 to the saw-toothed voltage—will cause the saw-toothed signal to be displaced voltagewise, while the Schmidt trigger circuit will continue to switch at its designed static voltage. Hence, while the saw-toothed signal from the follower 49 will always continue to define a square-wave signal from the Schmidt trigger circuit whose total period remains the same, the influence of the modulating voltage will be such as to define unequal periods within each cycle of its repetition rate whenever the value of the modulating voltage is other than zero.

The output signal from the trigger circuit 60 is conveyed to the grid of triode 63 located in the phase-inverter circuit 64. The signals produced in the plate and the grid of the phase inverter are identical in characteristics except for phase. In other words, the signals are equal in amplitude and duration but opposite in phase.

At this point, it will be noted that the signal input to the phase inverter is, in effect, a pulse-duration modulated version of the carrier signal from the oscillator 10; and the modulation is linear with respect to the amplitude of the modulating signal. Hence, each of the two signals taken from the phase inverter 64 are likewise pulse-duration modulated signals; and these latter two signals, as indicated in the figure, are taken from terminals labeled "A" and "B." These two terminals, it will be noted, correspond to the two terminals identified by the same legends in the electronic gate circuit 70.

The gate 70 shown in Figure 2 consists of two balanced pentodes 71 and 72 comprising a non-pedestalling electronic gate or switch. It is the function of this gate to pass bursts of the carrier signal received from the cathode follower 41 during one or the other part of each cycle of the pulse-duration modulated signal from the originating trigger circuit 60. Thus, one signal from the phase inverter 64 is impressed upon the suppressor grid of triode 71; and the remaining signal from the inverter is impressed upon the suppressor grid of the other pentode 72. It follows, then, that the two pentodes in the electronic gate are switched at the repetition rate. The carrier signal, it will be noted, is applied to only one of the two pentodes—namely, pentode 71—so that the output from the electronic gate 70 consists of bursts of the carrier signal, each burst having a length controlled by the duration of the modulated square wave activating the switch. Thus, the presence of the sine-wave carrier signal defines one half or portion of the given repetition-rate period, while the absence of the sine wave defines the other half or portion of the same period. This signal is then conveyed to a recording head 80 for impression upon a magnetic recording medium.

A suitable amplifying device such as a triode or the like may be inserted in the circuit between the electronic gate 70 and the recording head 80. Also, a device such as a cathode follower 81 is preferably inserted to isolate the head from the gate. Likewise, a variable resistor or control 82 is preferably provided as shown to control the amplitude of the signal supplied to the recording head 80.

Having thus described a circuit suitable for recording a seismic signal in accordance with the principles of this invention, attention is now directed to Figure 3 in which is illustrated a circuit suitable for reproducing the recorded signal. Referring to this figure, a signal from the head 80 is transmitted through one or more tuned amplifying stages to a phase inverter 92. Two amplifying stages 90 and 91 are shown, since it has been found in magnetic recording systems that more than one stage of amplification is usually necessary to provide an adequate signal for further processing.

The phase inverter 92 supplies two equal but oppositely phased signals to the grids of two triodes 93 and 94 which together comprise an absolute-value circuit. The output of the absolute-value circuit, then, is in effect essentially a rectified sine-wave signal; and it will be noted that it can be produced by rectifiers if so desired.

The signal from the absolute-value circuit is applied to a Schmidt trigger circuit 95 biased such that the base line of the rectified sine-wave signal is maintained to one side of the unstable center point of the trigger circuit. Accordingly, the presence of any rectified signal in the signal train applied to the Schmidt trigger circuit causes the trigger circuit to change to its alternate state and remain there until the rectified signal has passed. Absence of the rectified signal—i.e., once the signal has passed—causes the trigger circuit to revert to its original state. Thus, the trigger circuit is the translating means for putting the bursts of rectified sine-wave signals back into square-wave form and thus re-constituting the original square-wave, time-duration modulated signal present in the modulating unit. This square wave-type signal is referenced to ground as by means of a clamping diode 96; and it is then passed to the carrier filter network 97, where its high-frequency components are removed and integrated to reconstruct the original seismic modulating signal.

While the embodiment of the invention illustrated in the drawing and described above is contemplated to constitute the best mode of carrying out this invention, it will be recognized that numerous modifications and variations may be practiced without departing from the spirit or scope of the invention. Thus, it will be recognized that the invention in its basic concept comprises a system for handling a seismic signal by using the signal to pulse-duration modulate a relatively high-frequency carrier signal. The carrier signal, in addition, is further characterized in that each pulse is in effect a burst of a signal of even higher frequency than the pulsing frequency. In other words, each cycle of the pulsing signal is divided into two portions—one portion consisting of a burst of a high-frequency signal, and the other portion being devoid of the high-frequency signal. The relative proportions of the two portions in each cycle of the pulsing signal are varied or modulated in a linear relation to the amplitude of the modulating seismic signal.

Referring to Figure 1, it will be recognized that the signal sources for the high-frequency carrier signal and the relatively low-frequency pulsing signal may be derived and synchronized in several different ways. Thus, it is possible to use two separate oscillators driven in synchronism—i.e., in a phase-locked relation. Again, it is possible to have the pulsing signal source be the master oscillator and the high-frequency carrier signal source be a slave oscillator or driven generator. For example, the pulsing frequency source may be used to drive one or more conventional squaring circuits to form the higher-frequency carrier signal. In any event, it is preferred that the original carrier signal and the pulses of carrier signal ultimately produced be phase-locked so that each pulse of the latter signal starts when the former signal crosses its zero axis every so many cycles and in a given direction.

As shown in Figures 1 and 4, and as will be apparent in Figures 2 and 3, it is readily possible to handle more than one seismic signal simultaneously. Different seismic signals may be recorded on separate channels of a recording medium; or, alternatively, they may be multiplexed and recorded on a single channel. To place two channels or signals on one magnetic tape track, for example, the output from two modulators—each modulator receiving a separate modulating signal—may be fed to one recording head. In such cases, the carrier signal supplied to the one modulator and its associated gate should have a frequency preferably at least about 1000 cycles per second removed from the frequency of the carrier signal supplied to the other modulator and gate. The amplitudes of the two carrier signals leaving the gates should be adjusted such that each signal occupies no more than one-half the dynamic amplitude range of the magnetic recording tape. A single pickup head connected to two tuned amplifiers may be used to reproduce the recorded signals. Each amplifier is tuned to select bursts of one of the two frequencies for detection, thus recreating separately the identities of the two modulating signals.

Figure 4 shows schematically an arrangement for multiplexing two signals "C" and "D" in the manner just discussed. Oscillators 100 and 110 emit frequencies at least 1000 cycles per second, and the generators 101 and 111 effect the same degree of division of the two carrier signals.

Signal "C" is fed to comparator 103 of modulator 102 in the manner described in Figure 1, and bursts of the carrier signal from oscillator 100 are sent through gate 104 to recording head 115. Simultaneously, signal "D" is fed to comparator 113 of modulator 112, and bursts of the signal from oscillator 110 are sent through gate 114 to the head 115. The reproducing head 117 picks up the signals from the recording medium 116 and transmits them simultaneously to amplifiers 118 and 120. Amplifier 118 is tuned to pass signals having the frequency of the oscillator 100, while amplifier 120 is tuned to pass signals having the frequency of the oscillator 110. Accordingly, detectors 119 and 121 "see" signals corresponding to signal "C" and signal "D," respectively.

Figure 5 illustrates how the invention may be modified very readily to provide a means for continuously controlling the amount of modulation in the modulated signals that are produced by the invention. The modification is unique among modulation systems in that the control is effected by varying the gain of the linearly sloping signal from the saw-tooth generator rather than the modulating signal. In conventional modulation systems, the gain of the modulating signal is affected, giving rise to possible noise problems.

Referring to Figure 5, it will be seen that only a portion of the circuitry of Figure 2 has been illustrated, since it is merely this portion that is modified in the manner just described to attain the modulation control effect just described. Specifically, the variable resistor 52 of Figure 2 is replaced with an automatic linearly variable resistance—for example, of the type described in U.S. 2,726,290 (E. H. Meier). The automatically variable resistor is indicated by the dotted outline 31, and means 30 is provided to supply this resistor with a unidirectional control voltage derived from the seismic signal circuit.

While this description has been concerned with an embodiment of the invention in which the modulated signals are recorded on a magnetic medium, it will be recognized that other types of recording media and systems may be used. The use of reproducible-type media and systems such as described in the Rieber patent, supra, is especially contemplated.

The invention claimed is:

1. In a seismic recording system, the improvement which comprises means to generate a constant-frequency, constant-amplitude carrier signal, gating means connected to said oscillator and operable to pass a signal comprising pulses of said carrier signal at regular intervals, means for maintaining such pulsing signal in a preselected phase relationship with said carrier signal, and means to modulate the duration of said pulses in response to amplitude variations in a seismic signal.

2. In a system for recording a seismic signal, the improvement which comprises means to generate a constant-frequency, constant-amplitude carrier signal, means to generate a second signal comprising a plurality of regularly spaced pulses in a phase-locked relation with said carrier signal, means responsive to said pulsing signal to repeatedly gate said carrier signal at regular intervals, and means to vary the duration of successive gating periods in response to amplitude variations in the seismic signal.

3. In a system of signal modulation, means for generating a constant-frequency, constant-amplitude carrier signal, means to generate a constant-amplitude pulsing signal in phase-locked relation with said carrier signal wherein a first edge of each pulse is equally spaced in time from the corresponding edges of adjacent pulses, and wherein the opposite edge of each pulse is variable in its time position between the first edge of that pulse and the first edge of the next adjacent pulse in response to the amplitude of the modulating signal, means for modulating said pulsing signal with said seismic signal to form a pulse-duration modulated signal, gating means responsive to said pulse-duration modulated signal to pass duration-modulated bursts of said carrier signal.

4. A signal-modulation system using a seismic signal as the modulating signal which comprises means to generate a constant-frequency, constant-amplitude carrier signal, means to pulse-duration modulate bursts of said carrier signal at a constant pulsing rate in response to amplitude variations in said seismic signal, said carrier frequency and said bursts of pulses occurring in phase-locked relation.

5. In a system for recording a seismic signal, the improvement which comprises an oscillator for generating a constant-frequency, constant-amplitude carrier signal, repetition-rate generating means responsive to said carrier signal to generate a pulsing signal having preselected constant-phase relationship with said carrier signal, a comparator circuit for combining said pulsing signal and said seismic signal, means to generate a second pulsing signal whose pulse durations are modulated in response to amplitude variations in said seismic signal, a gating circuit connected to said oscillator and responsive to said second pulsing signal to release duration-modulated, phase-locked bursts of said carrier signal.

6. A signal-modulation system in which the modulating signal is a seismic signal comprising: means to generate a constant-frequency, constant-amplitude carrier signal, means to generate a constant-frequency pulsing signal of lower frequency than said carrier signal and of greater frequency than said seismic signal, means to maintain said carrier signal and said pulsing signal in a phase-locked relation, means responsive to said pulsing signal to translate amplitude variations of said seismic signal into a duration-modulated pulsing signal, and gating means responsive to said duration-modulated pulsing signal to pass bursts of said carrier signal whose durations are modulated in accordance with said amplitude variations of said seismic signal.

References Cited in the file of this patent

UNITED STATES PATENTS

| | | |
|---|---|---|
| 1,941,618 | Nemirovsky | Jan. 2, 1934 |
| 1,951,524 | Nicolson | Mar. 20, 1934 |
| 2,266,401 | Reeves | Dec. 16, 1941 |
| 2,451,824 | Gaunella et al. | Oct. 19, 1948 |
| 2,492,736 | Custin | Dec. 27, 1949 |
| 2,556,457 | Watts | June 12, 1951 |
| 2,557,950 | Deloraine | June 26, 1951 |
| 2,782,372 | Barditch | Feb. 19, 1957 |
| 2,868,963 | McMillan | Jan. 13, 1959 |